United States Patent [19]
Iacovazzi et al.

[11] 3,767,374
[45] Oct. 23, 1973

[54] GLASS WARE REJECT APPARATUS

[75] Inventors: Michael A. Iacovazzi, Bristol; Constantine W. Kulig, Windsor, both of Conn.

[73] Assignee: Emhart Corporation, Bloomfield, Conn.

[22] Filed: Oct. 26, 1971

[21] Appl. No.: 192,140

[52] U.S. Cl..................... 65/165, 65/160, 214/11 C
[51] Int. Cl................................................ C03b 9/44
[58] Field of Search............................. 65/160, 165; 214/11 R, 11 A, 11 C

[56] References Cited
UNITED STATES PATENTS
2,770,796   11/1956   Böer ................................ 214/11 A FOREIGN PATENTS OR APPLICATIONS
633,152   12/1961   Canada................................ 65/160

Primary Examiner—Arthur D. Kellogg
Attorney—John C. Linderman

[57] ABSTRACT

A ware reject apparatus is employed in a glassware forming machine in which a plurality of molds are operated to supply a corresponding plurality of bottles in series on a common output conveyor. The apparatus permits malformed bottles coming from a particular mold to be eliminated from the conveyor by means of an ejector mechanism mounted adjacent the conveyor and operated by an electrical sequence timer driven in synchronism with the conveyor. A selector panel is connected with the sequence timer and has a plurality of manually operated switches corresponding respectively to each of the molds in the glassware forming machine. When a particular mold is malfunctioning and producing a low quality bottle, the corresponding switch on the selector panel is actuated and electrical timing signals from the sequence timer cause the ejector mechanism to schematically remove each of the bottles produced by the malfunctioning mold.

10 Claims, 4 Drawing Figures

GLASS WARE REJECT APPARATUS

BACKGROUND OF THE INVENTION

The present invention relates to glassware forming machines and, more particularly, is directed to a ware reject apparatus that can be utilized to remove malformed articles from a common output conveyor serving several different molds.

Increased production rates for glassware items such as disposable and nondisposable glass bottles have been achieved through the use of Individual Section (I.S.) glassware forming machines. An I.S. machine may contain one, two or three forming molds in each section and is referred to respectively as a single, double or triple gob machine. All of the molds in the several sections are operated in synchronism through a synchronizing cam shaft connected with each station and the articles from all of the sections are deposited in a series on a common output conveyor usually leading to a lehr in which the glassware is annealed.

The I.S. machine has been universally accepted as a forming machine in the glassware industry in part because of the capability of shutting down a given section for repair or mold exchange without interfering with the output of the remaining sections. Often it is possible for a machine operator to determine when a specific mold in an I.S. machine is producing malformed articles. If the corrective action required is minor, the individual section can be shut down briefly and restarted after repair without a great loss in production. However, if the corrective action requires a major overhaul of a mold, shutting down the entire section for an extended period of time may result in an untimely production loss from a whole section and it may be preferable to continue operation when, for instance, only one of the molds requires repair.

Also, when a mold is started from a cold condition while other molds are already at their operating temperature, the initial output of containers from the cold mold is generally unacceptable until the heated glass brings the mold up to its stable operating temperature.

In each of the above cases, that is where a mold continues to operate improperly and produces a low quality article, it is desirable to be able to eliminate the articles produced by that particular mold from the series of articles supplied on the common output conveyor serving the several machine sections.

Accordingly, it is a general object of the present invention to provide a ware reject apparatus which can be operated with a glassware forming machine having a plurality of molds to remove each of the articles produced by selected molds in the machine.

SUMMARY OF THE INVENTION

The present invention resides in a ware reject apparatus for a glassware forming machine supplying articles from a plurality of molds in series on a common output conveyor. The apparatus permits articles from a selected mold to be systematically removed from each series. The apparatus includes a sequencing means having an input member connected with the forming machine for producing phased timing signals for each article from the plurality of molds in the series on the output conveyor. The sequencing means in one form is an electrical sequence timer having a rotor driven in synchronism with the conveyor loader in the forming machine and a plurality of circuit completing members actuated by the rotor to produce phased timing signals corresponding to each of the molds and articles on the conveyor. Selector means is connected to the sequencing means and has a plurality of switches corresponding to the plurality of molds to transmit selected timing signals from the sequencing means. Ejector means, such as a pneumatically operated plunger assembly, is connected with the selector means and responds to the timing signals transmitted by the plurality of switches to remove the corresponding articles in the series from the conveyor. In this manner each of the articles produced by a particular mold identified with a switch of the selector means transmitting a timing signal is removed from the common output conveyor. By permitting the switches of the selector means to be manually actuated, an operator can select one or more articles to be removed from each series on the conveyor.

DESCRIPTION OF THE PREFERRED EMBODIMENT

Figure 1:
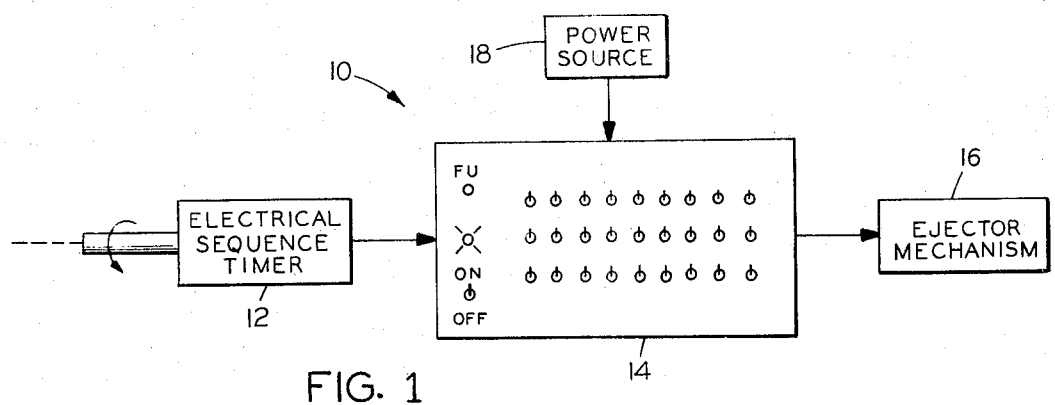
FIG. 1 is a schematic diagram of the ware reject apparatus embodying the present invention.

FIG. 1 shows a ware reject apparatus for a glassware forming machine which supplies articles from a plurality of molds in series on a common output conveyor. The reject apparatus is capable of removing a malformed article associated with a particular mold from each series of articles produced by the molds and deposited on the conveyor. The particular embodiment of the ware reject apparatus, generally designated at 10, is capable of operating with an I. S. glassware forming machine having eight sections, each section having three forming molds. Of course, the invention is not limited to any given number of molds or sections and can be used with other machines having various types of forming molds.

The reject apparatus 10 is composed principally of an electrical sequence timer 12, a selector panel 14 to which associated electrical control circuitry is attached and an ejector mechanism 16. An electrical power source 18 is connected to the selector panel 14 and provides the power necessary to operate the electrical components in the sequence timer 12, the panel 14 and the ejector mechanism 16.

The sequence timer 12 is mechanically driven from a cam shaft which controls pusher bar assemblies that load the glassware from each section of the forming machine serially on the common output conveyor serving the sections. The pusher bar assemblies are controlled by the cam shaft in such a manner that the lead bottles from each individual section are evenly spaced from one another on the conveyor and the bottles from the molds of one section are evenly spaced from one another. For example, with an eight-section, triple-gob machine, eight groups of three bottles each are deposited on the conveyor during each molding cycle with the first bottles of the groups spaced serially along the conveyor at the same interval and with the bottles in each group also evenly spaced from one another but by an amount which is smaller than the spacing between lead bottles. With triple gob machines, all of the bottles are generally evenly spaced, but in a double gob machine the bottles may be clustered in groups of two at regular intervals with the same spacing in each group. The timer 12 is utilized to produce phased timing signals corresponding respectively to the articles of glassware from the plurality of molds in the series of articles deposited on the conveyor during each molding cycle of the machine. The selector panel 14 contains a plurality of manually actuated switches which correspond to each mold and are arranged on the face of the panel 14 in three parallel rows corresponding to the three molds in each machine section. The selector panel 14 permits an operator to select which one of the articles in the production series will be rejected during each of the molding cycles. Selected timing signals from the timer 12 are transmitted by the selector panel switches to an electrical control circuit which actuates the ejector mechanism 16 at the precise moment when a malformed article, such as a bottle, on the conveyor passes in front of the ejector mechanism 16. The ejector mechanism 16 may take the form of an electrically actuated, air-operated plunger assembly which pushes the rejected bottle off the output conveyor.

Figure 3:
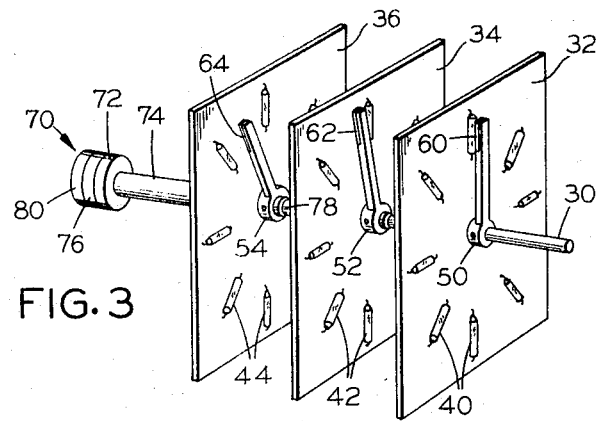
FIG. 3 is a perspective view of the internal components in the electrical sequence timer of FIG. 2.
Figure 2:
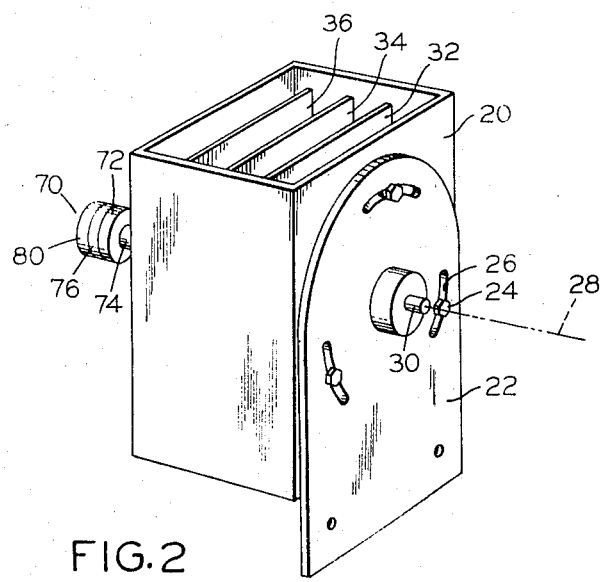
FIG. 2 is a perspective view of the electrical sequence timer in FIG. 1.

FIGS. 2 and 3 show the construction of the electrical sequence timer 12 in detail. The timer 12 has a housing or support frame 20 which is supported on an adjustable bracket 22 by means of three clamping bolts 24. The bolts 24 extend through arcuate slots 26 in the bracket 22 and permit the frame 20 to be rotatably adjusted about a central axis 28 relative to the bracket 22. The timer 12 has an input shaft 30 which is connected to the cam shaft operating the pusher bar assemblies so that the shaft 30 rotates in synchronism with the mechanism which deposits the bottles on the output conveyor. The input shaft 30 extends centrally through printed circuit boards 32, 34 and 36 which are held fixedly within the frame 20.

A plurality of magnetically sensitive proximity switches 40, 42, 44 are mounted respectively in circular arrays on the three circuit boards 32, 34, 36 inserted in the support frame 20. Three rotor arms 50, 52, 54 are connected with the input shaft 30 adjacent the respective circuit boards 32, 34, 36 and are rotated together about the axis 28 by the shaft 30.

Each of the rotor arms 50, 52, 54 has a magnetic slug or wand 60, 62, 64 respectively at a radial station overlying the circular array of switches 40, 42 and 44 so that rotation of the input shaft 30 causes the magnetic wands to be scanned adjacent each of the switches on one of the circuit boards. The switches 40, 42, 44 and the corresponding wands 60, 62, 64 are matched so that a switch closes and opens in that sequence as the wand passes in close proximity to it. With the array of switches on a single circuit board, a series of phased timing signals can be produced by completing a timing signal circuit through each one of the switches as the rotor arm causes the wand to scan over the switches.

Each one of the proximity switches 40, 42, 44 corresponds to one of the molds in the individual section forming machines. The switches on each one of the circuit boards are spaced circumferentially in the circular array by amounts corresponding to the separation between the individual sections of the forming machine, or more particularly, the spacing between bottles on the output conveyor from corresponding molds of the several machine sections. For example, the switches 40 on the printed circuit board 32 correspond to the lead bottles on the output conveyor from the first mold in each machine section. A timing signal generated by scanning a switch 40 and transmitted by the selector panel 14 has a time relationship with the motion of the corresponding bottle on the conveyor such that the ejector mechanism 16 responding to the timing signal causes the corresponding bottle to be removed from the conveyor. In a similar manner, the switches 42 arranged on the circuit board 34 correspond respectively to the bottles produced by the second mold in each machine section and the timing signal generated by a switch 42 causes the ejector mechanism 16 to remove the corresponding bottle from the output conveyor. In the same manner, the timing signals generated by switches 44 are associated with the bottles produced by the third mold in each machine section and may be removed by exciting the ejector mechanism 16 with the timing signal from the corresponding switch 44 on the circuit board 36.

From the above, it is apparent that the time relationship between the generation of the timing signals and the position of the bottles on the conveyor must be accurately adjusted so that the selected bottle is removed without disturbing the adjacent bottles. The rate at which the timing signals are generated and the speed of the bottles on the conveyor are synchronized by driving the input shaft 30 from the cam shaft controlling pusher bar assemblies which deposit the bottles on the conveyor as described above. The phase relationship of the timing signals and the positions of the bottles in the series on the conveyor may be set by several adjusting mechanisms.

To adjust the phase relationship of the timing signals produced by the proximity switches in the circuit board 32 relative to the positions of the lead bottles from each section of the forming machine, clamping bolts 24 are loosened and the entire frame 20 is rotated about the axis 28 relative to the bracket 22 and the input shaft 30 until the proper timing is established between the operation of the ejector mechanism 16 and the registration of the corresponding bottle on the conveyor with the plunger of the ejector mechanism. To set the timing for either the second or third bottle from any given section of the forming machine, a phase adjuster 70 is mounted to the end of the input shaft 30. The phase adjuster 70 has an adjusting knob 72 and shaft 74 connected to the rotor arm 54 and an adjusting knob 76 and shaft 78 connected to the rotor arm 52. The shafts 74 and 78 are mounted coaxially on the input shaft 30 and are rotatable relative to each other and to the shaft 30 by means of the knobs 72 and 76. Each of the knobs 72 and 76 is held frictionally engaged with one another and with the flange 80 keyed to the input shaft 30 so that once the phase adjustment between the knobs and therefore the rotor arms has been set, it does not change. With the phase adjustment properly set, each of the timing signals produced by the proximity switches 40, 42, 44 will correspond to one of the bottles on the conveyor from the plurality of molds in the I.S. machine and the signals, if transmitted by the switches on the selector panel 14, cause the ejector mechanism 16 to remove the corresponding bottle or bottles from the conveyor.

Figure 4:
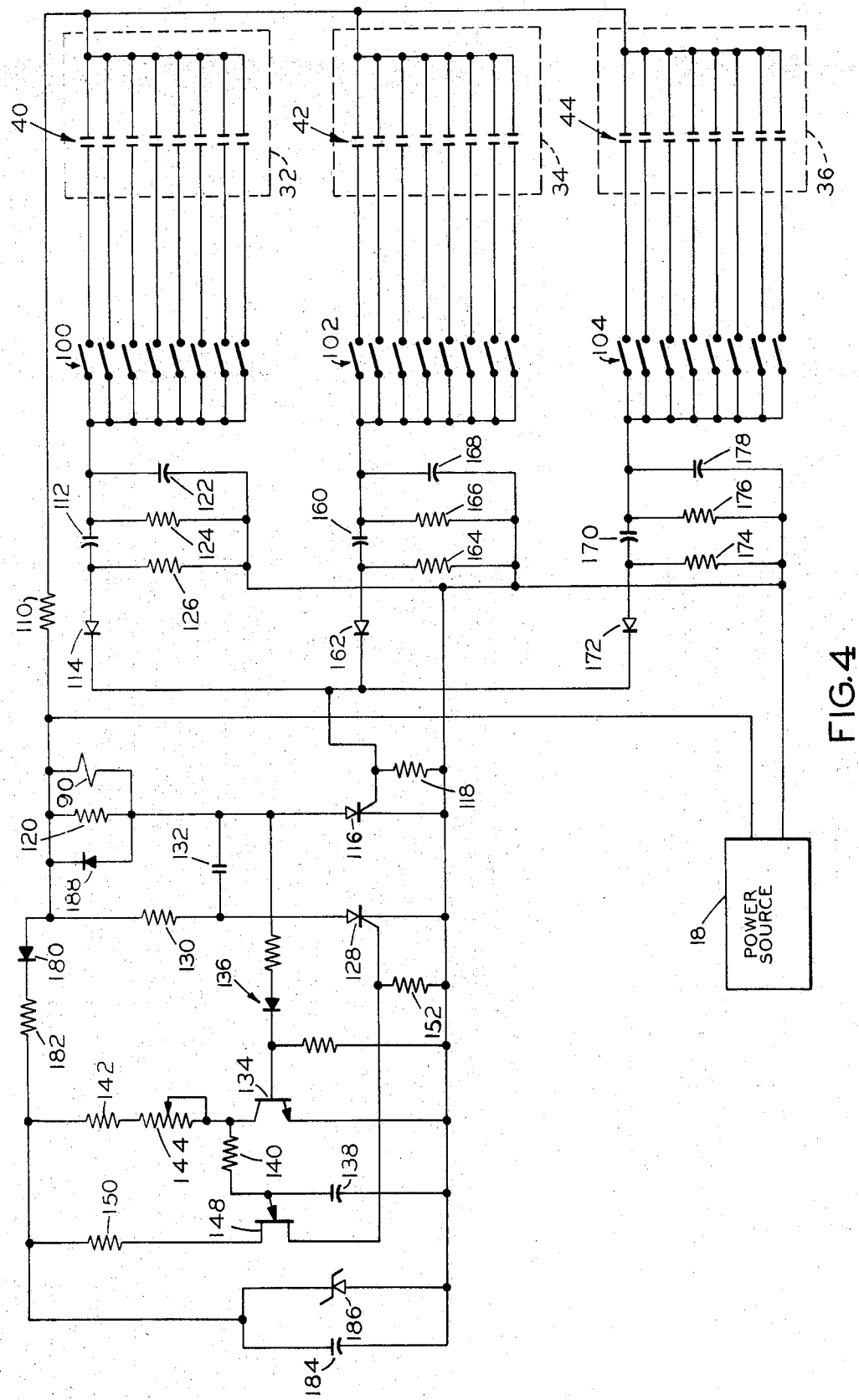
FIG. 4 is an electrical diagram of the ware reject apparatus shown in FIG. 1.

FIG. 4 shows the proximity switches 40, 42, 44 in an electrical control circuit suitable for operating an electrical solenoid 90 in the ejector mechanism 16 to cause the plunger to push a bottle off the output conveyor. Each of the proximity switches 40, 42, 44 is connected in series with one of the manually actuated selector switches 100, 102, 104 which are arranged in the three parallel rows on the face of the selector panel 14 shown in FIG. 1. Each of the selector switches and its associated proximity switch can therefore be identified with one of the molds in the I.S. forming machine. The manually actuated switch corresponding to a malfunctioning mold is closed by the machine operator when he discovers that the corresponding bottle is improperly formed. After one of the manually operated switches is closed and the connecting proximity switch closes, a circuit is completed which transmits an electrical timing signal through the closed switches to an electrical actuating circuit connected to the solenoid 90 in the eject mechanism 16.

The timing signal takes the form of a timing pulse having a leading edge corresponding with the closing of the proximity switch and a trailing edge corresponding to the opening of the proximity switch. While the leading edge of such timing pulses can be reliably correlated with the scanning of a switch by the wand, the trailing edge of such pulses cannot be so reliably correlated due to individual variations in the closure intervals of such switches. If the closure interval is prolonged and the operation of the plunger of the eject mechanism 16 is controlled by the closure interval, the plunger may remain extended and cause the next adjacent bottle in the series on the conveyor to be inadvertently upset with perhaps several more of the bottles.

For this reason the electrical control circuit actuates the solenoid 90 in response to the leading edge of the timing pulse produced by a proximity switch and cuts off the timing signal a preselected interval after the solenoid is actuated, the interval being selected to prevent the plunger of the ejector mechanism from upsetting adjacent bottles on the conveyor. The control circuit is so designed that it will respond to each timing signal transmitted by the switches 100, 102, 104 even though the closure intervals of the proximity switches which produce timing signals overlap.

The solenoid actuating circuit completed when one of the proximity switches 40 and the connecting manual switch 100 are closed is energized by the DC power source 18 and includes the charging resistor 110 and charging capacitor 112. A current pulse through resistor 110, the switch 40, the switch 100, the capacitor 112, a diode 114 and the gate resistor 118 of the silicon controlled rectifier 116 turns the rectifier 116 on and causes current to flow through a load resistor 120 and the solenoid 90 connected to the anode of the rectifier. Energizing the solenoid 90 causes the plunger of the ejector mechanism 16 to remove the bottle corresponding with the closed switches 40 and 100 from the output conveyor. As the capacitor 112 becomes charged, the current pulse decays, but the rectifier 116 continues to conduct and holds the solenoid 90 in the actuated condition. When the proximity switch 40 eventually opens, the charging capacitor 112 and an associated capacitor 122 discharge through the resistors 124 and 126 without further affecting the gate of the silicon controlled rectifier 116. Therefore, only the leading edge of the timing pulse is utilized to actuate the solenoid 90.

A limiting circuit shown generally to the left of the silicon controlled rectifier 116 in FIG. 4 includes another silicon controlled rectifier 128 which is connected in series with a load resistor 130 and has its anode connected with the anode of the rectifier 116 through a commutating capacitor 132. The limiting circuit also includes an RC timer circuit including the transistor 134 having its emitter connected to a diode and voltage divider 136. The voltage divider 136 is energized through the load resistor 120 and holds the transistor 134 ON whenever the silicon controlled rectifier 116 is not conducting. When the timing signal energizes the solenoid 90, the voltage divider 136 sets the transistor 134 OFF and effectively removes the short in the timing circuit across the capacitor 138 and resistor 140 in series with the resistors 142 and 144. The resistor 144 is adjustable to vary the time constant of the timer circuit. When the charge in the capacitor 138 reaches the peak point voltage at the emitter of the uni-junction transistor 148, the transistor begins to conduct heavily through the resistor 152 and produces a triggering pulse which forces the rectifier 128 into full conduction through resistor 130. The voltage drop through the resistor 130 causes the commutating capacitor 132 to suppress the voltage at the anode of the rectifier 116 to a negative value and cuts the rectifier off. The solenoid 90 in turn is de-energized and the plunger of the ejector mechanism 16 retracts so that subsequent bottles can pass unimpeded on the conveyor.

During the interval in which the rectifier 116 is cut off, the voltage divider 136 drives the transistor 134 into saturation and the transistor shorts out the timing capacitor 138 and register 140 so that further pulses from the uni-junction transistor 138 are inhibited. The silicon controlled rectifier 128 remains in the conductive condition until the next timing signal turns the silicon controlled rectifier 116 on and suppresses the voltage on the anode of rectifier 128 through the commutating capacitor 132.

In order for the electrical control circuit to be responsive to any two or three consecutive timing signals even though two or three of the proximity switches may have overlapping closure periods, the timing signals from any three consecutively operated proximity switches are applied to separate actuating circuits. Any three consecutively operated proximity switches will include one switch on each of the circuit boards; therefore, the switches on each circuit board are connected respectively to separate actuating circuits. In particular, the proximity switches 40 charge the capacitor 112 through a diode 114 and resistor 110. The proximity switches 42 charge another capacitor 160 through diode 162 and the resistor 110 and the capacitor 160 discharges through resistors 164 and 166 in conjunction with the capacitor 168. The proximity switches 44 charge capacitor 170 through a diode 172 and the resistor 110 and the capacitor 170 discharges through resistors 174, 176 in conjunction with capacitor 178. The diodes 114, 162 and 172 isolate each of the actuating circuits from each other and permit the resistor 118 on the gate of the silicon controlled rectifier 116 to respond independently to each of the actuating currents charging the capacitors 112, 160 and 170. By providing at least three actuating circuits and appropriately spacing the proximity switches on the circuit boards 32, 34, 36, the most prolonged closure period of any given proximity switch may be restricted to a period shorter than the scanning period in which two adjacent proximity switches on the same circuit board are actuated.

The remaining components of the actuating and limiting circuits provide filtering and isolation as needed. The diode 180 isolates the timer circuitry from the actuating circuits. The resistor 182 and capacitor 184 provide filtering for the timing circuit and the zener diode 186 regulates the voltage applied to the timer circuit. The diode 188 shorts out the inverse voltage spike appearing across the solenoid 90 when it is cut off.

It will thus be seen that the ware reject apparatus disclosed in the present invention may be set by a machine operator to reject a particular bottle produced by a given mold in the I.S. glassware forming machine in each molding cycle. Of course, it is also possible to more fully automate the reject apparatus by connecting the disclosed apparatus to an inspection or other device so that the selector switches 100, 102, 104 identifing a particular mold in the I.S. machine are automatically actuated by the inspection device as a result of the detection of a malformed article. Although the particular embodiment of the apparatus described and shown is intended to operate with 24 different molds in eight machine sections, the number of molds accommodated can be increased or decreased by correspondingly increasing or decreasing the number of proximity switches which are employed. The circuit boards 32, 34, 36 may be made for easy replacement or substitution to accomplish such modification. Also, if a single or double gob glassware forming machine is employed instead of a triple gob machine, the number of circuit boards utilized in the sequence timer 12 can be reduced proportionally. While the proximity switches are magnetically actuated switches which close to complete the actuating circuit and produce the timing signal, it is also possible to utilize a mechanical switch in which one common contact connected with the resistor 112 is mounted on the rotor arm and fixed contacts are located in the circular array on the circuit boards. Accordingly, the present invention has been described in a preferred embodiment by way of illustration rather than limitation.

What is claimed is:

1. A ware reject apparatus for a glassware forming machine or the like supplying articles from a plurality of molds in series on a common output conveyor comprising: sequencing means having an input member connected with the forming machine for producing phased timing signals for each article from the plurality of molds in the series on the output conveyor; selector means connected to the sequencing means and having a plurality of switches corresponding to the plurality of molds for transmitting selected timing signals from the sequencing means; ejector means for removing selected articles in the series from the conveyor; and ejector control means interconnecting the selector means and the ejector means for actuating the ejector means in response to the timing signals transmitted by the selector means, the control means also having cutoff means for limiting the actuating time of the ejector means.

2. A ware reject apparatus as defined in claim 1 wherein the sequencing means includes a rotor arm rotatable about a rotor axis and connected for rotation to the input member, and a set of circuit completing members actuated by the rotor arm and distributed in a circular scanning array about the rotor axis adjacent the rotor arm.

3. A ware reject apparatus as defined in claim 2 wherein the sequencing means includes at least two rotor arms mounted coaxially on the same rotor axis and two sets of circuit completing members distributed in circular arrays about the rotor axis adjacent the respective rotor arms; and further includes means for adjusting the rotational positions of the rotor arms relative to one another about the rotor axis.

4. A ware reject apparatus as defined in claim 3 wherein the sequencing means comprises a support frame rotatably adjustable about the rotor axis independently of the means for adjusting the rotor arms relative to one another, the circuit completing members being connected with support frame.

5. A ware reject apparatus as defined in claim 2 wherein the set of circuit completing members comprises a set of magnetically sensitive proximity switches and the rotor arm comprises a magnetic wand scanned sequentially adjacent each proximity switch of the set.

6. A ware reject apparatus as defined in claim 1 wherein the ejector means includes an electrically actuated solenoid; the ejector control means comprises an electrical actuating circuit connected with the solenoid and responsive to each of the timing signals transmitted by the selector means; and the cutoff means includes a limiting circuit cutting off the electrical actuating circuit a preselected interval after actuation of the solenoid.

7. A ware reject apparatus as defined in claim 6 wherein the actuating circuit and the limiting circuit jointly include first and second silicon controlled rectifiers, a commutating capacitor interconnecting the anodes of the rectifiers and a timer circuit, the gate of the first silicon controlled rectifier being connected to the selector means for receiving the timing signals and the gate of the second silicon controlled rectifier being connected to the timer circuit.

8. A ware reject apparatus as defined in claim 7 wherein the electrically actuated solenoid of the ejector means is connected in series with the first silicon controlled rectifier and the anode of the first silicon controlled rectifier is connected to the timer circuit.

9. A ware reject apparatus as defined in claim 8 wherein the timer circuit includes a serially connected resistor and capacitor.

10. A ware reject apparatus as defined in claim 1 wherein the plurality of switches in the selector means produce timing signals in the form of timing pulses having leading and trailing edges associated with the opening and closing of the switches; and wherein the ejector control means is connected with the plurality of switches and is responsive to the leading edge of the timing pulses to actuate the ejector means and the cutoff means limits the actuating time of the ejector means independently of the trailing edge of the timing pulses.

* * * * *